United States Patent Office 2,708,671
Patented May 17, 1955

2,708,671

2-AMINO-5-NITRO-1,3,4-THIADIAZOLE

Edmund B. Towne and Joseph B. Dickey, Kingsport, Tenn., assignors to Eastman Kodak Company, Rochester, N. Y., a corporation of New Jersey No Drawing. Original application August 27, 1952, Serial No. 306,712. Divided and this application November 19, 1953, Serial No. 393,212

1 Claim. (Cl. 260—306.8)

This invention relates to 2-amino-5-nitro-1,3,4-thiadiazole, 2-sulfanilamido-5-nitro-1,3,4-thiadiazole and 2-sulfanilamido-5-amino-1,3,4-thiadiazole and to a process for their preparation.

2-amino-5-nitro-1,3,4-thiadiazole, as fully shown hereinafter, is a valuable intermediate for the preparation of azo dye compounds useful for coloring various textile materials, especially cellulose acetate textile materials. 2-amino-5-nitro-1,3,4-thiadiazole also possesses interesting possibilities in the pharmaceutical field because the sulfathiadiazole compounds just mentioned and which have the general formula:

I.
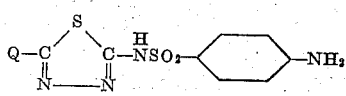

wherein Q represents a nitro group or an amino group are readily prepared therefrom. 2-amino-5-nitro-1,3,4-thiadiazole likewise may have direct utility as a medicinal such as, for example, the control of Blackhead disease in turkeys.

It is an object of our invention to provide 2-amino-5-nitro-1,3,4-thiadiazole, 2-sulfanilamido-5-nitro-1,3,4-thiadiazole and 2-sulfanilamido-5-amino-1,3,4-thiadiazole. Another object is to provide a satisfactory process for the preparation of the new 1,3,4-thiadiazole compounds of our invention. A further object is to prepare light and gas fast azo dye compounds from 2-amino-5-nitro-1,3,4-thiadiazole. A still further object is to provide dyed cellulose acetate textile materials which have good fastness to light and gas.

Azo compounds that can be prepared from 2-amino-5-nitro-1,3,4-thiadiazole include those having the general formula:

II.
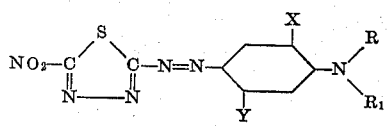

wherein R represents an alkyl group having 1 to 4, inclusive, carbon atoms, a hydroxyalkyl group having 2 to 4, inclusive, carbon atoms, an alkoxyalkyl group having 3 to 4, inclusive, carbon atoms, a β-cyanoethyl group, a —CH₂CH₂COOCH₃ group, a —CH₂CH₂COOC₂H₅ group, a 2,2-difluoroethyl group, a 2,2-difluoro-n-propyl group, a 3,3-difluoropropyl group, a 3,3-difluoro-n-butyl group, a 2,2,2-trifluoroethyl group or a 3,3,3-trifluoropropyl group, R₁ represents a hydroxyalkyl group having 2 to 4, inclusive, carbon atoms or an acetoxyethyl group, X represents a hydrogen atom, a methoxy group or an ethoxy group and Y represents a hydrogen atom, a methyl group, a bromine atom, a chlorine atom, a methoxy group, an ethoxy group, an acetylamino group, a propionylamino group or a butyrylamino group.

The azo compounds having the formula numbered II are useful for coloring textile materials made of or containing a cellulose carboxylic acid ester having 2 to 4 carbon atoms in the acid groups thereof. They are especially of use for the coloration of cellulose acetate textile materials. When applied to the aforesaid textile materials, they give orange to red dyeings which for the most part have good fastness to both light and gas. These azo compounds also color wool, silk, nylon, polyethylene terephthalate and modified polyacrylonitrile textile materials similar shades.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The azo compounds having the formula numbered II are prepared by diazotizing 2-amino-5-nitro-1,3,4-thiadiazole and coupling the diazonium compound obtained with a compound having the formula:

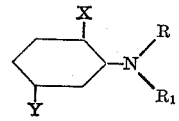

wherein R, R₁, X and Y have the meaning previously assigned to them.

Illustrative of the alkyl groups represented by R are the methyl, the ethyl, the n-propyl, the isopropyl and the n-butyl groups. Similarly the β-hydroxyethyl, the β-hydroxypropyl, the γ-hydroxypropyl, the β,γ-dihydroxypropyl, the β-methyl-β,γ-dihydroxypropyl, the γ-methoxy-β-hydroxypropyl and the δ-hydroxybutyl groups are illustrative of the hydroxyalkyl groups R and R₁ represent.

The following examples illustrate the compounds of our invention and their manner of preparation:

EXAMPLE 1

*Preparation of 2-amino-5-nitro-1,3,4-thiadiazole*

10 grams of 2-amino-1,3,4-thiadiazole were dissolved in 50 cc. of fuming nitric acid at room temperature. The reaction mixture resulting was then heated to 40° C. and maintained at this temperature for 1 to 2 hours, while stirring. Following this, the reaction mixture was drowned on ice and filtered. 2-amino-5-nitro-1,3,4-thiadiazole was collected on the filter as a bright yellow crystalline product and was washed with water until neutral and then dried. The dried product weighed 8.5 grams and had a melting point of 173° C. Upon crystallization from ethyl alcohol, the 2-amino-5-nitro-1,3,4-thiadiazole reaction product had a melting point of 178° C.

2-amino-1,3,4-thiadiazole is a known compound. This compound having a melting point of 191° C. was prepared by cyclizing N-formylthiosemicarbazide

(NH₂CSNHNHCHO)

with excess acetyl chloride at room temperature [Ber. 29, 2516 (1896)], and neutralizing the hydrochloride salt with sodium hydroxide. The N-formylthiosemicarbazide having a melting point of 175° C., was prepared by refluxing thiosemicarbazide with formic acid for several hours. Both 2-amino-1,3,4-thiadiazole and N-formylthiosemicarbazide were purified by crystallization from ethyl alcohol.

EXAMPLE 2

7.7 grams (0.05 mole) of 2-amino-5-nitro-1,3,4-thiadiazole were dissolved in 20 cc. of pyridine and 12.7 grams of acetylsulfanilyl chloride were added slowly, with stirring, at such a rate that the temperature did not exceed 50° C. The reaction mixture was then heated on a steam bath for 1 hour. To this was added a solution of 1.2 grams (0.05 mole) of NaOH in 15 cc. of water and the heating was continued for a short time. Drowning the solution in water, filtering and drying yielded 12.3 grams of crude yellow crystals of 2-N-acetyl-sulfanilamido-5-nitro-1,3,4-thiadiazole.

Refluxing this product (0.035 mole) with 3.5 grams of NaOH in 40 cc. of water, diluting and neutralizing yielded 8.0 grams of yellow, crystalline 2-sulfanilamido-5-nitro-1,3,4-thiadiazole which may be crystallized from acetic acid.

EXAMPLE 3

8.0 grams (0.026 mole) of 2-sulfanilamido-5-nitro-1,3,4-thiadiazole were added gradually to a stirred suspension of 25 grams of iron powder in 80 cc. of 95% ethanol containing 1 cc. of 1:1 hydrochloric acid. After addition was complete, stirring and refluxing was continued for six hours. The reaction mixture was neutralized with dilute sodium hydroxide, filtered hot, and diluted with five volumes of water. The crude product that crystallized out (4.5 grams) was purified from aqueous ethyl alcohol under a nitrogen atmosphere yielding white crystals of 2-sulfanilamido-5-amino-1,3,4-thiadiazole.

EXAMPLE 4

A. Preparation of nitrosyl sulfuric acid 1.52 grams of sodium nitrite were added portionwise to 10 cc. of concentrated sulfuric acid, with stirring, and the temperature of the reaction mixture was allowed to rise to 65° C. The resulting solution was then cooled to 5° C. and 20 cc. of a mixture consisting of 3 cc. of propionic acid and 17 cc. of acetic acid were added dropwise, with stirring, while allowing the temperature to rise to 15° C. and maintaining it at this temperature during the remainder of the addition.

B. Diazotization

The nitrosyl sulfuric acid mixture prepared as described above was cooled to 0° C.–5° C. and then 2 grams of 2-amino-5-nitro-1,3,4-thiadiazole were added portionwise, while stirring, after which 20 cc. of a propionic-acetic acid mixture prepared as described above were added while keeping the temperature of the reaction mixture at 0° C–5° C. The reaction mixture thus obtained was then stirred at 0° C.–5° C. for 2 hours and excess sodium nitrite present was destroyed by adding 0.5 gram of urea. A clear diazonium solution was obtained.

C. Coupling 10 cc. (0.004 mole) of the 2-amino-5-nitro-1,3,4-thiadiazole diazonium solution prepared as described in B above were added, with stirring, at 0° C.–5° C. to a solution of 0.84 gram of N-ethyl-N-β,γ-dihydroxypropyl-m-toluidine in 10 cc. of a 1:6 mixture of propionic-acetic acid (i. e. 1 part by volume of propionic acid to 6 parts by volume of acetic acid) cooled in an ice bath. After a short time, the reaction mixture was made neutral to Congo paper by adding sodium acetate portionwise and the coupling reaction was allowed to proceed for 20–30 minutes, after which the reaction mixture was poured into ice water. After stirring a sort time, the reaction mixture was filtered to recover the dye compound formed on the filter. The dye compound thus obtained was washed well with water and dried. 0.7 gram of the dye compound having the formula:

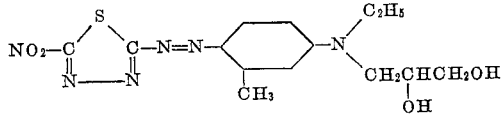

was obtained. This compound has excellent affinity for cellulose acetate textile materials and colors them bright salmon pink shades having excellent fastness to light and gas. The light fastness of the dyeings obtained with this compound on nylon textile materials is likewise exceptionally good.

EXAMPLE 5

10 cc. of the 2-amino-5-nitro-1,3,4-thiadiazole diazonium solution prepared as described in B of Example 4 were coupled at 0° C.–5° C. with a solution of 0.78 gram of N,N-di-β-hydroxyethyl-m-toluidine in 10 cc. of a 1:6 mixture of propionic-acetic acid. Coupling and recovery of the dye compound formed were carried out in accordance with the general procedure described in Example 4. 0.74 gram of a compound which dyes cellulose acetate textile materials salmon pink shades that have excellent fastness to light and gas was obtained. The compound of this example gives dyeings on nylon textile materials which have remarkable fastness to light.

EXAMPLE 6

10 cc. of the 2-amino-5-nitro-1,3,4-thiadiazole diazonium solution prepared as described in Example 4 were coupled with a solution of 0.86 gram of N,N-di-β-hydroxyethyl-m-chloroaniline. Coupling and recovery of the dye compound formed were carried out in accordance with the general procedure described in Example 4. A good yield of a compound which colors cellulose acetate and nylon textile materials orange-pink shades, having excellent fastness to light and gas was obtained. The dyeings obtained on these materials had good wash and crocking fastness and gave sharp, white discharge prints.

EXAMPLE 7

10 cc. of a 2-amino-5-nitro-1,3,4-thiadiazole diazonium solution prepared as described in Example 4 were coupled with a solution of 0.88 gram of N-ethyl-N-β-acetoxyethyl-m-toluidine. Coupling and recovery of the dye compound formed were carried out in accordance with the general procedure described in Example 4. A good yield of a compound which colors cellulose acetate and nylon textile materials pinkish-orange shades having excellent fastness to light and gas was obtained.

EXAMPLE 8

10 cc. of a 2-amino-5-nitro-1,3,4-thiadiazole diazonium solution prepared as described in Example 4 were coupled with a solution of 0.86 gram of N-β-hydroxyethyl-N-2,2-difluoroethyl-m-toluidine in 10 cc. of a 1:6 mixture of propionic-acetic acid. Coupling and recovery of the dye compound formed were carried out in accordance with the procedure described in Example 4. The dye compound obtained colors cellulose acetate and nylon textile materials orange shades having excellent fastness to light and gas.

EXAMPLE 9

10 cc. of a 2-amino-5-nitro-1,3,4-thiadiazole diazonium solution prepared as described in Example 4 were coupled with a solution of 0.88 gram of N-ethyl-N-CH₂CH₂COOCH₃-m-toluidine in 10 cc. of a 1:6 mixture of propionic-acetic acid. Coupling and recovery of the dye compound formed were carried out in accordance with the general procedure described in Example 4. The dye compound obtained colors cellulose acetate and nylon textile materials bright orange-pink shades having excellent fastness to light and gas.

EXAMPLE 10

10 cc. of a 2-amino-5-nitro-1,3,4-thiadiazole diazonium solution prepared as described in Example 4 were coupled with a solution of 0.99 gram of N-β-hydroxyethyl-N-3,3,3-trifluoropropyl-m-toluidine in 10 cc. of a 1:6 mixture of propionic-acetic acid. Coupling and recovery of the dye compound formed were carried out in accordance with the general procedure described in Example 4. The dye compound obtained colors cellulose acetate and nylon textile materials bright orange shades having excellent fastness to light and gas.

EXAMPLE 11

10 cc. of a 2-amino-5-nitro-1,3,4-thiadiazole diazonium solution prepared as described in Example 4 were coupled with a solution of 0.89 gram of N-ethyl-N-β-methyl-β,γ-dihydroxypropyl-m-toluidine in 10 cc. of a 1:6 mixture of propionic-acetic acid. Coupling and recovery of the dye compound formed were carried out in accordance with the general procedure described in Example 4. The dye compound obtained colors cellulose acetate textile materials pinkish-orange shades.

EXAMPLE 12

10 cc. of a 2-amino-5-nitro-1,3,4-thiadiazole diazonium solution prepared as described in Example 4 were coupled with a solution of 0.90 gram of N,N-di-β-hydroxyethyl-2-methoxy-5-chloroaniline in 10 cc. of a 1:6 mixture of propionic-acetic acid. Coupling and recovery of the dye compound formed were carried out in accordance with the general procedure described in Example 4. The dye compound obtained colors cellulose acetate textile materials pinkish-red shades.

EXAMPLE 13

10 cc. of a 2-amino-5-nitro-1,3,4-thiadiazole diazonium solution prepared as described in Example 4 were coupled with a solution of 0.96 gram of N-β,γ-dihydroxypropyl-N-β-methoxyethyl-m-toluidine in 10 cc. of a 1:6 mixture of propionic-acetic acid. Coupling and recovery of the dye compound formed were carried out in accordance with the general procedure described in Example 4. The dye compound obtained colors cellulose acetate textile materials pinkish-orange shades.

EXAMPLE 14

10 cc. of a 2-amino-5-nitro-1,3,4-thiadiazole diazonium solution prepared as described in Example 4 were coupled with a solution of 0.92 gram of N-2,2-difluoro-n-propyl-N-β-hydroxypropylaniline in 10 cc. of a 1:6 mixture of propionic-acetic acid. Coupling and recovery of the dye compound formed were carried out in accordance with the general procedure described in Example 4. The dye compound obtained colors cellulose acetate textile materials pinkish-orange shades.

EXAMPLE 15

10 cc. of a 2-amino-5-nitro-1,3,4-thiadiazole diazonium solution prepared as described in Example 4 were coupled with a solution of 0.94 gram of N-n-propyl-N-γ-methoxy-β-hydroxypropyl-m-toluidine in 10 cc. of a 1:6 mixture of propionic-acetic acid. Coupling and recovery of the dye compound formed were carried out in accordance with the general procedure described in Example 4. The dye compound obtained colors cellulose acetate textile materials pinkish-orange shades.

EXAMPLE 16

10 cc. of a 2-amino-5-nitro-1,3,4-thiadiazole diazonium solution prepared as described in Example 4 were coupled with a solution of 0.81 gram of N-β-hydroxyethyl-N-2,2-difluoroethylaniline in 10 cc. of a 1:6 mixture of propionic-acetic acid. Coupling and recovery of the dye compound formed were carried out in accordance with the general procedure described in Example 4. The dye compound obtained colors cellulose acetate textile materials orange shades.

EXAMPLE 17

10 cc. of a 2-amino-5-nitro-1,3,4-thiadiazole diazonium solution prepared as described in Example 4 were coupled with a solution of 0.88 gram of N-β,γ-dihydroxypropyl-7-methyltetrahydroquinoline in 10 cc. of a 1:6 mixture of propionic-acetic acid. Coupling and recovery of the dye compound formed were carried out in accordance with the general procedure described in Example 4. The dye compound obtained has the formula:

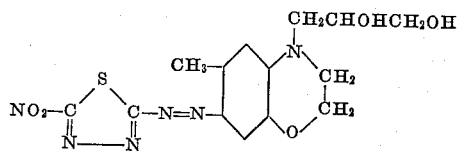

It colors cellulose acetate textile materials red shades.

EXAMPLE 18

10 cc. of a 2-amino-5-nitro-1,3,4-thiadiazole diazonium solution prepared as described in Example 4 were coupled with a solution of 0.90 gram of N-β,γ-dihydroxypropyl-7-methylbenzomorpholine in 10 cc. of a 1:6 mixture of propionic-acetic acid. Coupling and recovery of the dye compound formed were carried out in accordance with the general procedure described in Example 4. The dye compound obtained has the formula:

It colors cellulose acetate textile materials red shades.

The compounds tabulated hereinafter further illustrate the azo compounds that can be prepared from 2-amino-5-nitro-1,3,4-thiadiazole. These compounds are prepared by diazotizing 2-amino-5-nitro-1,3,4-thiadiazole and coupling the diazonium compound obtained with the coupling components named hereinafter. The color given is that which the compounds color cellulose acetate textile materials. The diazotization, coupling and recovery operations are carried out in accordance with the procedure described hereinbefore.

| Coupling Component | Color |
|---|---|
| 1. N,N-di-β-hydroxyethyl-m-acetylaminoaniline | pinkish-orange. |
| 2. N,N-di-β-hydroxyethyl-2-methoxy-5-acetylaminoaniline | red. |
| 3. N,N-di-β-hydroxyethyl-2-methoxy-5-methylaniline | Do. |
| 4. N,N-di-β-hydroxyethyl-2,5-dimethoxyaniline | pinkish-red. |
| 5. N,N-di-β-hydroxyethyl-2,5-diethoxyaniline | Do. |
| 6. N-β-methoxyethyl-N-β-methyl-β,γ-dihydroxypropyl-m-toluidine | pinkish-orange. |
| 7. N-β-ethoxyethyl-N-β-hydroxyethylaniline | Do. |
| 8. N-CH₂CH₂COOCH₃-N-β,γ-dihydroxypropyl-m-toluidine | orange-pink. |
| 9. N-β,γ-dihydroxypropyl-N-β-acetoxyethylaniline | pinkish-orange. |
| 10. N-β-hydroxyethyl-N-δ-hydroxybutylaniline | Do. |
| 11. N-β-hydroxyethyl-N-β,γ-dihydroxypropyl-m-toluidine | Do. |
| 12. N-n-propyl-N-β-hydroxyethyl-m-toluidine | Do. |
| 13. N-n-propyl-N-β,γ-dihydroxypropyl-m-toluidine | Do. |
| 14. N-n-propyl-N-β-methyl-β,γ-dihydroxypropyl-m-toluidine | Do. |
| 15. N-β,γ-dihydroxypropyl-N-3,3-difluoro-n-butyl-m-toluidine | Do. |
| 16. N-β-hydroxyethyl-N-2,2,2-trifluoroethylaniline | orange. |
| 17. N-β-hydroxyethyl-N-2,2-difluoro-n-propylaniline | Do. |
| 18. N-β-hydroxyethyl-N-3,3-difluoropropyl-m-toluidine | pinkish-orange. |
| 19. N-β-hydroxyethyl-N-2,2-difluoro-n-propylaniline | orange. |
| 20. N-β-hydroxyethyl-N-3,3-difluoro-n-butylaniline | pinkish-orange. |
| 21. N-β-hydroxyethyl-N-β-cyanoethylaniline | orange. |
| 22. N-n-butyl-N-β,γ-dihydroxypropylaniline | Do. |
| 23. N-β-hydroxypropyl-N-β-hydroxyethylaniline | Do. |
| 24. N-methyl-N-n-propylaniline | Do. |
| 25. N-CH₂CH₂COOC₂H₅-N-β-hydroxyethylaniline | Do. |
| 26. N,N-di-β-hydroxypropylaniline | Do. |
| 27. N,N-di-β-hydroxyethyl-m-bromoaniline | Do. |
| 28. N,N-di-β-hydroxyethyl-m-n-propionylaminoaniline | pinkish-orange. |
| 29. N,N-di-β-hydroxyethyl-m-n-butyrylaminoaniline | Do. |
| 30. N-β,γ-dihydroxypropyl-2,7-dimethyltetrahydroquinoline | red. |
| 31. N-β-hydroxyethyl-2-methyltetrahydroquinoline | Do. |
| 32. N-β,γ-dihydroxypropyl-2,5-dimethylbenzomorpholine | Do. |
| 33. N-β,γ-dihydroxypropyl-2,7-dimethylbenzomorpholine | Do. |
| 34. N-methyl-N-β,γ-dihydroxypropyl-m-toluidine | orange. |
| 35. N,N-di-β-hydroxypropyl-m-toluidine | pinkish-orange. |
| 36. N,N-di-γ-hydroxypropyl-m-toluidine | Do. |
| 37. N-n-propyl-N-γ-methoxy-β-hydroxypropyl-m-toluidine | Do. |
| 38. N-methyl-N-β-hydroxyethylaniline | orange. |
| 39. N,N-dimethyl-m-toluidine | Do. |
| 40. N-ethyl-N-β-hydroxyethylaniline | Do. |
| 41. N,N-di-β-hydroxypropyl-2-methoxy-5-methylaniline | red. |
| 42. N,N-di-β-hydroxyethyl-2-ethoxy-5-chloroaniline | Do. |

The azo dye compounds described herein can be applied to the textile materials named hereinbefore in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

This application is a division of our application Serial No. 306,712, filed August 27, 1952.

N-acetylsulfanilyl chloride, also known as p-acetamidobenzenesulfonyl chloride, has the formula:

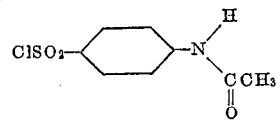

We claim:
2-amino-5-nitro-1,3,4-thiadiazole.

References Cited in the file of this patent

Ohta et al., Chem. Abstracts, vol. 46, col. 8095 (1952) citing J. Pharm. Soc. Japan, vol. 71, pp. 1481–4 (1951).
Nagazawa Chem. Abstracts, vol. 35, col. 458 (1941).
Prijs et al., Chem. Abstracts, vol. 42, col. 1934 (1948).